United States Patent [19]

Clar

[11] Patent Number: 4,525,237

[45] Date of Patent: Jun. 25, 1985

[54] METHOD OF REINFORCING LOOSE-LEAF SHEETS AND DISPOSABLE REINFORCING TAB APPLICATOR THEREFOR

[75] Inventor: Milton Clar, Bethesda, Md.

[73] Assignee: Leonard S. Blondes, Bethesda, Md.; a part interest

[21] Appl. No.: 381,318

[22] Filed: May 24, 1982

[51] Int. Cl.[3] .......................... B44C 1/00; B44C 7/00; B32B 31/00

[52] U.S. Cl. .................................... 156/540; 156/541; 156/577; 156/230; 156/249; 156/DIG. 33; 156/DIG. 48

[58] Field of Search ............... 156/391, 530, 527, 384, 156/540, 541, 542, 577, 584, DIG. 48, 230, 249, 289, DIG. 33; 206/395, 396, 406, 411; 24/67 R; D19/1, 99, 32; 222/185

[56] References Cited

U.S. PATENT DOCUMENTS

| | | | |
|---|---|---|---|
| 915,789 | 3/1909 | McComb | D19/1 |
| 915,790 | 3/1909 | McComb | D19/1 |
| 919,621 | 4/1909 | McComb | D19/1 |
| 1,869,385 | 8/1932 | Maish | D19/99 |
| 2,437,022 | 3/1948 | Fritzinger | 156/530 |
| 2,437,640 | 3/1948 | Hedrick, Sr. | D19/99 |
| 2,560,241 | 7/1951 | Pangburn et al. | 156/577 |
| 2,569,140 | 9/1951 | Avery | 156/DIG. 48 |
| 2,589,168 | 3/1952 | Vassar | D19/99 |
| 2,601,125 | 6/1952 | O'Connor | 24/67 R |
| 2,764,501 | 9/1956 | Perri | 24/67 R |
| 2,831,538 | 4/1958 | Lishman . | |
| 3,231,446 | 1/1966 | Satas | 156/384 |
| 3,265,553 | 8/1966 | Kind et al. | 156/384 |
| 3,286,713 | 11/1966 | Kurtz et al. . | |
| 3,315,683 | 4/1967 | Rodriguez | D19/32 |
| 3,656,430 | 4/1972 | Olsson | 156/384 |
| 3,674,609 | 7/1972 | Schrotz et al. | 156/577 |
| 3,686,055 | 8/1972 | Hermann | 156/384 |
| 3,890,191 | 6/1975 | Mayer | 156/541 |
| 3,947,313 | 3/1976 | Lichtwardt et al. | 206/396 |
| 3,951,726 | 4/1976 | Found | 156/527 |
| 4,008,119 | 2/1977 | Hermann | 156/541 |
| 4,026,758 | 5/1977 | Sato | 156/540 |
| 4,060,444 | 11/1977 | Schweig, Jr. et al. | 206/395 |
| 4,125,420 | 11/1978 | Hamisch, Jr. | 156/384 |
| 4,274,906 | 6/1981 | Clar | 156/540 |

FOREIGN PATENT DOCUMENTS

| | | | |
|---|---|---|---|
| 45-7586 | 3/1970 | Japan . | |
| 643124 | 6/1949 | United Kingdom . | |
| 810803 | 3/1959 | United Kingdom | 156/DIG. 48 |

*Primary Examiner*—Edward Kimlin
*Assistant Examiner*—Louis Falasco
*Attorney, Agent, or Firm*—Shapiro and Shapiro

[57] ABSTRACT

A low-cost disposable tab applicator and method of applying reinforcing tabs to the margin area of a sheet in a loose-leaf binder between a hole in the sheet through which a binder ring passes and an adjacent edge of the sheet, without the necessity of removing the sheet from the binder.

10 Claims, 4 Drawing Figures

METHOD OF REINFORCING LOOSE-LEAF SHEETS AND DISPOSABLE REINFORCING TAB APPLICATOR THEREFOR

BACKGROUND OF THE INVENTION

This invention relates to a method and apparatus for applying reinforcing tabs to sheets held in a loose-leaf binder to reinforce the holes in the sheets through which the rings of the binder pass.

The tendency of sheets of paper and the like held in a loose-leaf binder to rip or tear in the margin area of the sheet between the edge of the sheet and the hole through which the binder ring passes is well known. Various types of reinforcing tabs, such as annular rings of cloth having a water-activated glue backing, are available for repairing torn sheets or for reinforcing sheets to prevent them from being torn. However, most reinforcing tabs cannot be applied conveniently to the sheets unless the sheets are removed from the binder. This is burdensome and time-consuming, particularly when reinforcing a large number of sheets.

In my prior U.S. Pat. No. 4,274,906, issued June 23, 1981, an apparatus for automatically applying reinforcing tabs to loose-leaf sheets without requiring that the sheets be removed from a binder is disclosed. That apparatus comprises a case having a tab guide projecting therefrom. The tab guide is sized to fit within the ring of the loose-leaf binder and to position a tabbearing carrier strip between the edge of the sheet and the hole in the sheet through which the ring passes. Means are mounted on the case for advancing the carrier strip around an end of the tab guide within the ring; means are included for separating a tab from the carrier strip as it passes around the end; and means are provided on the tab guide for pressing the tab onto the sheet. Although the apparatus works very well to enable reinforcing tabs to be applied to loose-leaf sheets without the necessity of removing the sheets from the binder, it is desirable to provide a simpler, less expensive apparatus for reinforcing sheets in a loose-leaf binder, and it is to this end that the present invention is directed. The invention also provides a very simple method for applying such reinforcing tabs.

SUMMARY OF THE INVENTION

Briefly stated, in accordance with one aspect, the invention provides a device for applying a reinforcing tab to a sheet in a loose-leaf binder at a region of the sheet between a hole in the sheet through which a ring of the loose-leaf binder passes and an adjacent edge of the sheet, comprising a holder for holding a supply of reinforcing tabs carried on a carrier strip, an elongated member projecting from the holder, the member being sized to fit within the ring of the loose-leaf binder and to position the carrier strip between the edge of the sheet and the hole in the sheet through which the ring passes, the member having means for guiding the carrier strip from the holder along a first surface of the member, a deflecting edge adjacent to one end of the member around which the carrier strip is adapted to be pulled to separate a tab therefrom, and applicator means adjacent to the deflecting edge for pressing the separated tab onto the sheet.

In accordance with another aspect, the invention provides a method of applying reinforcing tabs carried on a carrier strip to sheets in a loose-leaf binder comprising inserting a guide for the carrier strip within a ring of the loose-leaf binder, positioning the carrier strip between the edge of the sheet and a hole in the sheet through which the ring passes, separating a tab from the carrier strip within the ring, and pressing the separated tab onto the sheet.

Significantly, the invention provides a simple, low-cost method and device for reinforcing sheets in a loose-leaf binder without the necessity of removing the sheets from the binder. A tab applicator device in accordance with the invention may take the form of a throw-away dispenser which can be manufactured and sold very inexpensively, thereby making the invention available to large numbers of users.

DESCRIPTION OF THE PREFERRED EMBODIMENT

Figure 1:
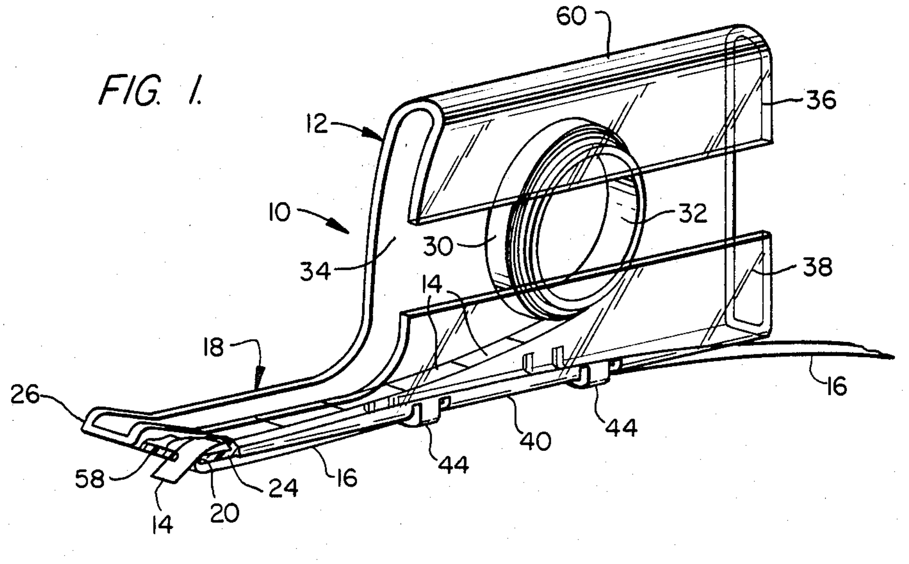
FIG. 1 is a perspective view, partially broken away, illustrating a tab applicator device in accordance with the invention.
Figure 2:
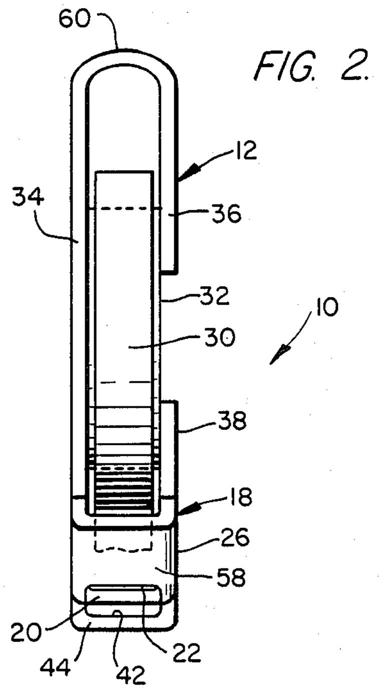
FIG. 2 is an end view of the device as seen from the left side of FIG. 1.
Figure 3:
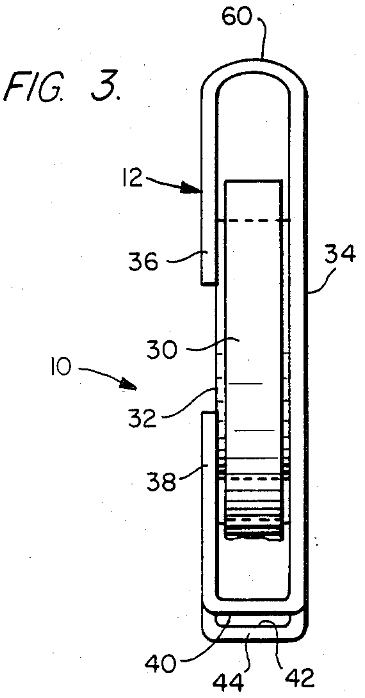
FIG. 3 is an end view of the device as seen from the right side of FIG. 1.

FIGS. 1–3 illustrate a preferred form of a tab applicator device 10 in accordance with the invention. The tab applicator is preferably formed as a unitary structure, shaped as illustrated in the figures, from a sheet of plastic or other low-cost material. As shown, the tab applicator may comprise a holder portion 12 for holding a supply of pressure-sensitive adhesive-backed reinforcing tabs 14 (such as described in the aforementioned U.S. Pat. No. 4,274,906) carried in end-to-end abutting relationship on a supporting carrier strip 16, and an elongated channel-shaped member 18, that constitutes a tab guide, projecting from one end of holder portion 12. Member 18 may have a deflecting edge 20 adjacent to one end thereof formed by a transverse slot 22 (see FIG. 2) in its base 24, and may have an angled pressure foot 26 formed adjacent to deflecting edge 20, as shown. As will be explained shortly, projecting member 18, deflecting edge 20 and pressure foot 26 may cooperate in a similar manner to that described in the aforementioned U.S. Pat. No. 4,274,906 (the disclosure of which is incorporated by reference herein) to separate a tab from the carrier strip and apply the tab to the margin area of a sheet in a loose-leaf binder.

As shown in FIG. 1, reinforcing tabs may be supplied from a roll 30 loosely supported for rotation on a spindle or hub 32 within holder portion 12. Spindle 32 may comprise a plastic ring attached, for example, to a rear wall 34 (in FIG. 1) of holder portion 12. The spindle may be attached by conventional means or may be constituted as an inward depression (not illustrated) in rear wall 34 upon which the roll of reinforcing tabs can be located. As is best illustrated in FIGS. 2 and 3, front wall segments 36 and 38 and rear wall 34 confine the roll of reinforcing tabs on the spindle. As is also best illustrated in FIGS. 2 and 3, the underside surface 40 of the tab applicator preferably has one or more transverse slots 42 formed by U-shaped projections 44 at the underside surface. The slots serve as guides for carrier strip 16, as illustrated in FIG. 1.

Figure 4:
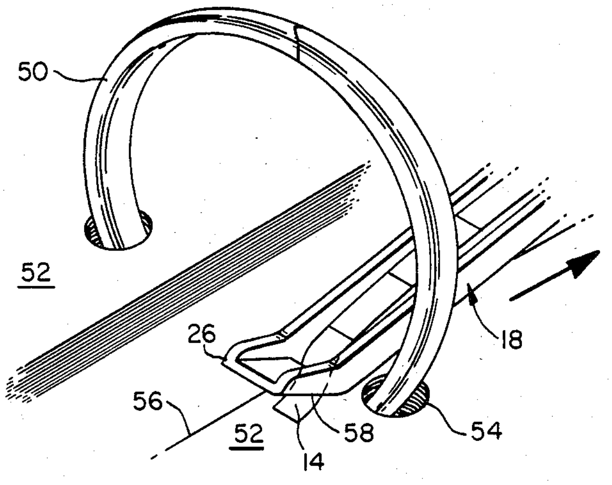
FIG. 4 is a perspective view illustrating the use of the tab applicator to apply a reinforcing tab to a sheet in a loose-leaf binder.

FIG. 4 illustrates the operation of the tab applicator. As shown, projecting member 18 is sized to be located within a ring 50 of a loose-leaf binder and to be positioned in the margin area of a sheet 52 between a hole 54 in the sheet through which the ring passes and the adjacent edge 56 of the sheet. As the tab-bearing carrier strip 16 is pulled (in a manner to be described) around deflecting edge 20, a tab 14 is separated therefrom (see FIG. 1 also) and directed beneath pressure foot 26 onto the sheet. As the tab contacts the sheet, the tab applicator may be lifted somewhat (rotated slightly counterclockwise in the figure) to bring the flat underside portion 58 of pressure foot 26 into contact with the tab, and, as the carrier strip 16 is advanced around deflecting edge 20, projecting member 18 may be pulled to the right in FIG. 4 and a slight downward pressure applied so that pressure foot 26 presses the tab to apply it to the sheet. This operation is quite similar to the operation of the tab applicator of the afore-referenced patent except that the carrier strip is advanced around the deflecting edge directly by the user, as will now be described.

Preferably, the tab applicator is sized so that the holder portion 12 fits conveniently in the palm of the user's hand and can be supported between his thumb and fingers. With the thumb along upper surface 60 of the holder portion and the fingers along lower surface 40, projecting member 18 can be positioned easily within a binder ring in the margin area of a sheet. Then, as the index or middle finger is slid rearwardly (to the right in FIG. 1) along the lower surface while engaging the carrier strip, the carrier strip, guided by the channel-shaped member 18, is drawn around the deflecting edge to separate a tab. simultaneously, the tab applicator can be rotated to bring the pressure foot surface 58 into contact with the tab and pulled out of the ring to apply the separated tab to the sheet.

As noted earlier, the tab applicator is preferably formed of plastic, although other low-cost materials may also be used. The shape of the tab applicator illustrated in the figures conveniently enables it to be formed from a single sheet of material using conventional techniques to afford a very low-cost device that may be discarded when the supply of tabs has been used. It will be appreciated, however, that other shapes and configurations may also be employed.

While a preferred embodiment of the invention has been shown and described, it will be apparent to those skilled in the art that changes can be made in this embodiment without departing from the principles and spirit of the invention, the scope of which is defined in the appended claims.

What is claimed is:

1. A device for applying a reinforcing tab to a sheet in a loose-leaf binder at a region of the sheet between a hole in the sheet through which a ring of the loose-leaf binder passes and an adjacent edge of the sheet, comprising a holder for holding a supply of reinforcing tabs carried on a carrier strip, an elongated member projecting from the holder, the member being sized to fit within the ring of the loose-leaf binder and to position the carrier strip between the edge of the sheet and the hole in the sheet through which the ring passes, a deflecting edge adjacent to one end of the projecting member around which the carrier strip is adapted to be passed to separate a tab therefrom, and applicator means adjacent to the deflecting edge for pressing the separated tab onto the sheet.

2. The device of claim 1, wherein the projecting member includes means for guiding the carrier strip bearing reinforcing tabs to the deflecting edge.

3. The device of claim 2, wherein the projecting member is channel-shaped.

4. The device of claim 1, wherein the deflecting edge is formed by a transverse slot in the projecting member, and the applicator means comprises an adjacent pressure foot angled with respect to the projecting member and having a surface adapted to press the separated tab onto the sheet.

5. The device of claim 4 further comprising guide means on an underside surface of the device for guiding the carrier strip away from the deflecting edge.

6. The device of claim 5, wherein the underside of the device is formed to enable the carrier strip to be engaged by a user's finger and to be drawn around the deflecting edge by movement of the finger.

7. The device of claim 1, wherein the holder comprises means for rotatably supporting a roll of reinforcing tabs.

8. The device of claim 7, wherein the holder is formed to provide a first wall that supports the roll on a spindle and a second wall that cooperates with the first wall to confine the roll on the spindle.

9. The device of claim 1, wherein the device is formed as a unitary structure from a single piece of material.

10. The device of claim 8, wherein the device is formed from a sheet of plastic shaped to provide the holder and the projecting member.

* * * * *

UNITED STATES PATENT AND TRADEMARK OFFICE

CERTIFICATE OF CORRECTION

PATENT NO. : 4,525,237

DATED : June 25, 1985

INVENTOR(S) : Milton Clar

It is certified that error appears in the above-identified patent and that said Letters Patent is hereby corrected as shown below:

The term of this patent subsequent to June 23, 1998, has been disclaimed.

Signed and Sealed this

Twenty-sixth Day of January, 1988

*Attest:*

DONALD J. QUIGG

*Attesting Officer*

*Commissioner of Patents and Trademarks*